United States Patent [19]

Heesen

[11] 4,403,936

[45] Sep. 13, 1983

[54] PRESS FOR COMPRESSING A POWDERY MATERIAL

[76] Inventor: Theodorus J. Heesen, Selissen 6, Boxtel, Netherlands

[21] Appl. No.: 261,084

[22] Filed: May 7, 1981

[30] Foreign Application Priority Data

May 14, 1980 [NL] Netherlands ........................ 8002783

[51] Int. Cl.[3] ........................ B29C 3/00

[52] U.S. Cl. ........................ 425/331; 425/382 R

[58] Field of Search ........................ 425/331, 382 R

[56] References Cited

U.S. PATENT DOCUMENTS

| | | | |
|---|---|---|---|
| 1,434,935 | 11/1922 | Steiger | 425/382 |
| 1,724,545 | 8/1929 | Ambrette | 425/382 |
| 2,391,638 | 12/1945 | Meakin | 425/382 |
| 2,626,576 | 1/1953 | Megkin | 425/171 |
| 2,798,444 | 7/1957 | Meakin | 425/331 |
| 3,010,150 | 11/1961 | Meakin | 425/331 |
| 3,307,501 | 3/1967 | Wenger | 425/331 |
| 3,551,950 | 1/1971 | Miyakawa et al. | 425/331 |
| 3,581,678 | 6/1971 | Landers | 425/331 |
| 3,762,854 | 10/1973 | Kilsdonk | 425/464 |
| 4,179,257 | 12/1979 | Hessen | 425/331 |

FOREIGN PATENT DOCUMENTS

| | | |
|---|---|---|
| 1540660 | 9/1968 | France . |
| 2380126 | 9/1978 | France . |
| 965391 | 7/1964 | United Kingdom . |

*Primary Examiner*—Jay H. Woo

*Attorney, Agent, or Firm*—Alan H. MacPherson; Steven F. Caserza; Richard Franklin

[57] ABSTRACT

The invention is relating to a press for compressing a powdery material to grains comprising a loosely arranged, rotatable annular, perforated mould supported and guided by a rotatable mould holder and by an axially displaceable supporting member which supports the mould at the end remote from the mould holder, the side face of a mould engaging the mould holder being urged by the supporting member with a given force against the mould holder in the operational position of the press in a manner such that during the operation of the press the mould is caught along by the mould holder owing to the force produced between the mould holder and the mould, whilst a rotatable roller is arranged in the mould whereby an uninterrupted channel is provided at least at the level of the side face of the mould engaging the drivable mould holder.

24 Claims, 3 Drawing Figures

PRESS FOR COMPRESSING A POWDERY MATERIAL

BACKGROUND OF THE INVENTION

The invention relates to a press for compressing powdery material to grains comprising a loosely arranged, rotatable, annular, perforated mould supported and guided by a drivable mould holder and by an axially displaceable supporting member supporting the mould at the end remote from the mould holder, the side face of the mould adjoining the mould holder being urged by the supporting member with a given force against the mould holder in the operational position of the press in a manner such that during the operation of the press the mould is caught along by the mould holder owing to a force produced between the mould holder and the mould, whilst a rotatable roller is arranged in the mould.

Such a press is described in Dutch Patent Application No. 7701448. In itself this press operates satisfactorily, but it has been found that due to small shifts of the mould with respect to the mould holder during operation powdery material accumulates between the mould holder and the side face of the mould engaging the mould holder. This material may result in an undesirable displacement of the mould with respect to the mould holder.

SUMMARY OF THE INVENTION

The invention has for its object to prevent in a simple manner such an undesirable displacement of the mould with respect to the mould holder.

According to the invention this can be achieved by providing an uninterrupted channel at least at the level of the side face of the mould engaging the drivable mould holder.

By providing this uninterrupted channel the powdery material penetrating in-between the side face of the mould concerned and the drivable mould holder can escape into said uninterrupted channel so that an accumulation of powdery material between the side face of the mould and the drivable mould holder with its inherent inconveniences is avoided. It is not necessary to provide complicated sealing members for preventing the powdery material from penetrating between the side face of the mould and the drivable mould holder.

The invention will be described more fully hereinafter with respect to one embodiment of the construction according to the invention shown schematically in the accompanying Figures.

BREIF DESCRIPTION OF THE DRAWING

DETAILED DESCRIPTION OF THE INVENTION

Figure 1:
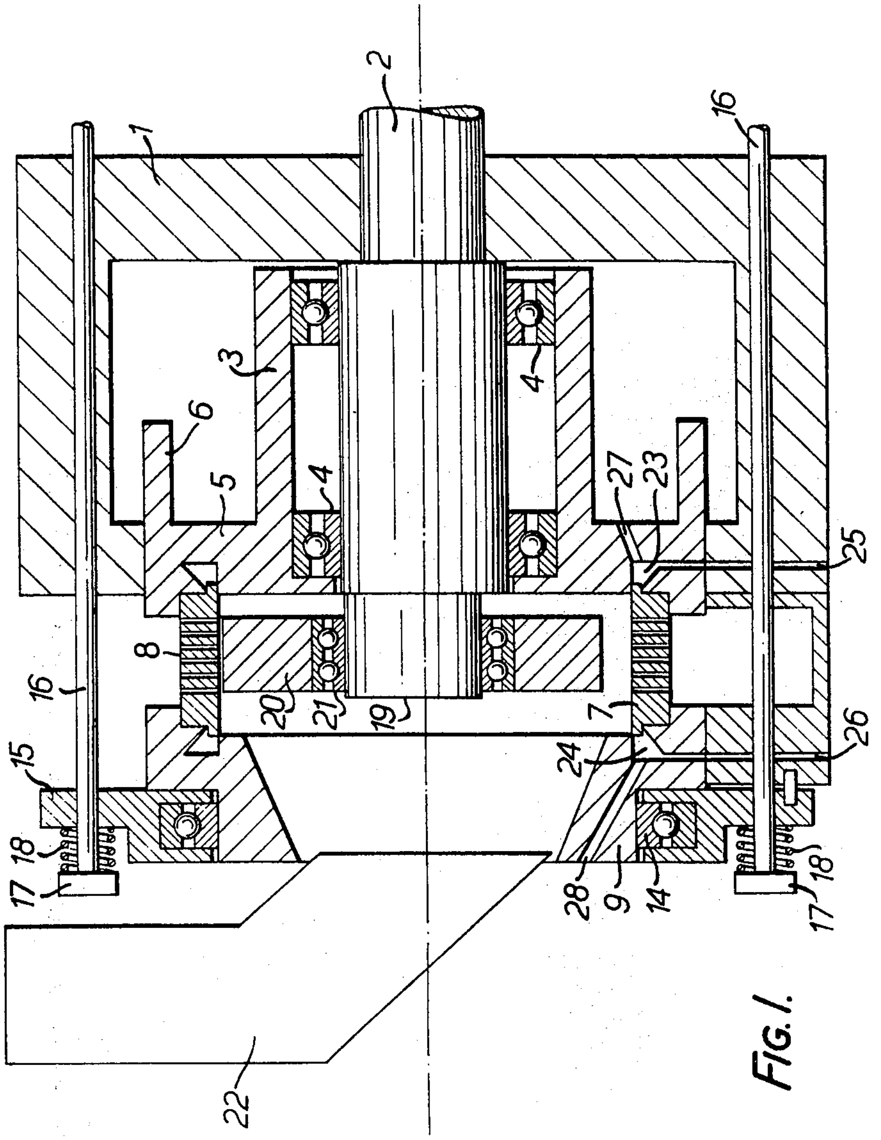
FIG. 1 is a schematic sectional view of an embodiment of a press in accordance with the invention.

The press shown in FIG. 1 comprises a supporting body 1 holding a shaft 2, on which a hub 3 is freely rotatable with the aid of ball bearings 4. One end of the hub is provided with a flange 5 being integral with the hub 3 and connecting the hub with a rim 6 extending on both sides outside the flange. Around the right-hand part of the rim as viewed in FIG. 2 can be passed a toothed belt or the like, with the aid of which the rim with the hub 3 can be caused to rotate about the shaft 2.

The left-hand part of the rim 6 as viewed in the drawing supports an annular mould 7 having perforations or passages 8.

Figure 2:
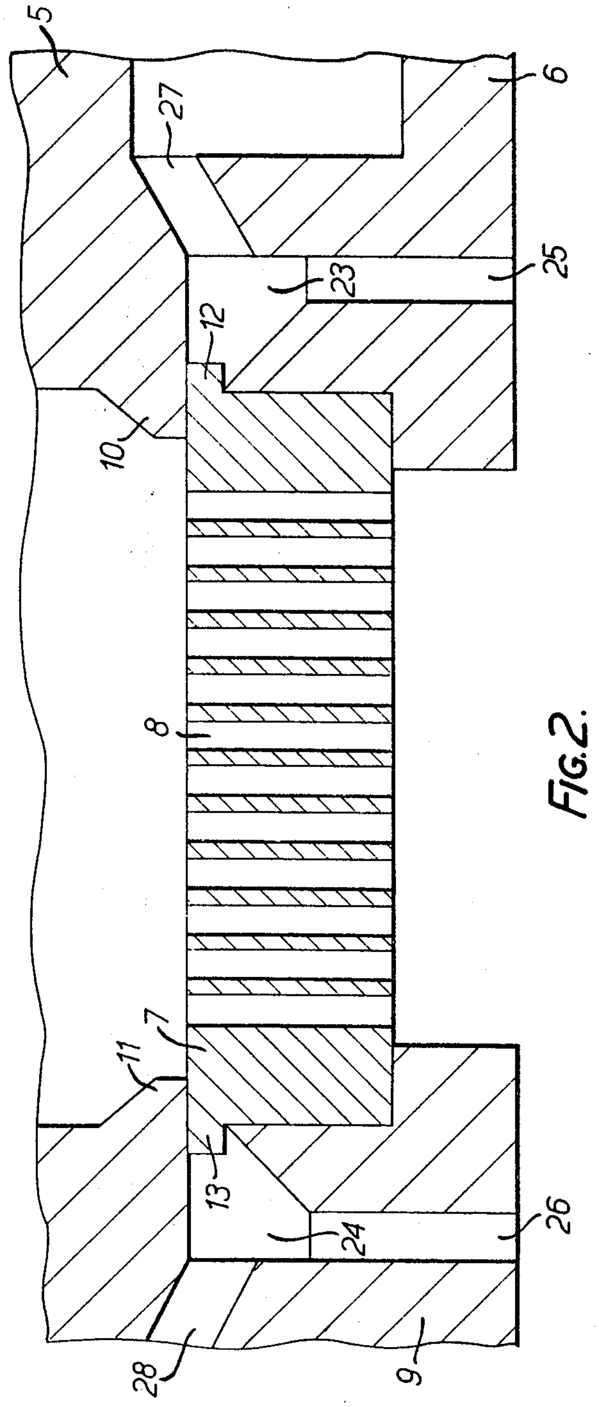
FIG. 2 is an enlarged sectional view of a detail of given component parts of the press shown in FIG. 1.

On the side remote from the flange 5 the annular mould 7 is arranged in a recess provided in an annular supporting member 9. FIG. 2 shows in particular that both the flange 5 and the annular supporting member 9 are preferably provided with noses 10 and 11 respectively extending over the inner circumferential wall of the annular mould 7, whilst the annular mould 7 is provided with annular extensions 12 and 13 respectively near its inner circumference and at the level of its side engaging the flange 5 and the supporting member 9 respectively.

Between the mould 7 and the flange 5 and between the rim 6 and the supporting member respectively rings of wear-resistant material and/or of a material having a high friction coefficient can be arranged as disclosed in Dutch Patent Application No. 7701448, which is hereby incorporated by reference.

However, as an alternative, permanent-magnetic material may be arranged on the sides of the mould instead of the friction material mentioned in Patent Application No. 7701448 so that the mould is better drawn around owing to the contributing magnetic force. The advantage thereof is that the mould is held in the correct position even without the axial clamping device being operative. As an alternative, this could be achieved by arranging electromagnets.

The supporting member 9 is rotatably journalled by means of a ball bearing 14 in a supporting plate 15. The supporting plate 15 is connected with the aid of a plurality of pins or bolts 16 extending parallel to the center line of the shaft 2 with the body 1, whilst heads 17 are provided at the ends of the pins or bolts remote from the body 1. Between the heads 17 and the supporting plate 15 the pins 16 are surrounded by compression springs 18, which firmly urge the mould 7 against the flange 5 through the supporting member 9. Instead of using these compression springs hydraulic or pneumatic rams may be employed for generating a sufficiently heavy force operating in an axial direction for pressing the supporting member 9 against the mould 7 and for pressing the mould 7 against the flange 5.

The shaft 2 has fastened to it eccentrically to the center line of shaft 2 a stub shaft 19, around which is freely rotatable a pressing roller 20 cooperating with the mould 7 with the aid of a ball bearing 21.

The device is furthermore provided with a feeding funnel 22, through which powdery material to be compressed can be fed to the mould 7 via the passage bounded by the annular supporting member 9.

It is apparent particularly from FIG. 2 that at the level of the interface between the flange 5 and the mould 7 an uninterrupted annular channel 23 is provided into which extends the annular extension 12, whilst at the level of the interface between the mould 7 and the supporting member 9 an uninterrupted annular channel 24 is provided into which extends the annular extension 13. With the annular channels 23 and 24 communicate one or more delivery passages 25 and 26 respectively and furthermore air supply channels 27 and 28 respectively, which open out as near the inner circumference of the channel concerned as possible.

When during operation the mould holder formed by the hub 3, the flange 5 and the rim 6 is caused to rotate, the mould 7 and through the mould 7 the annular supporting member 9 will be caught along owing to the frictional forces prevailing between these components. When subsequently powdery material is supplied, this material will be compressed by the roller 20. Owing to the pressing forces exerted on the mould 7 the latter tends to lead slightly with respect to the mould holder during operation so that there is no risk of the mould 7 ceasing to rotate. The forces exerted on the mould 7 are absorbed by the ball bearings 4 and 14 arranged one on each side of the mould. However, the supporting of the mould 7 by the annular supporting member 9 will be less stable than the supporting of the mould 7 by the mould holder formed by the parts 3, 5 and 6. Therefore, during operation the mould will slightly tend to tilt so that opposite the spot where the roller 20 presses the material through the perforations 8 a gap may be formed between the side face of the mould and the mould holder.

If the axial pressing force is comparatively slight, such a gap may also be formed between the annular supporting member and the side face of the mould engaging the same. If no further precautions are taken the powdery material to be compressed can be sucked into said gaps and urge the various parts of the press away from one another.

By using the construction according to the invention the powdery material tending to penetrate in-between the mould holder and the mould or between the mould and the annular supporting member respectively will get into the uninterrupted channels 23 and 24, from which it is conducted away through the passages 25 and 26. This removal is enhanced by the air supply channels 27 and 28. Moreover, the penetration of the powdery material between the parts of the press is also prevented as much as possible by noses 10 and 11 which overlap the inner circumference of the mould.

Figure 3:
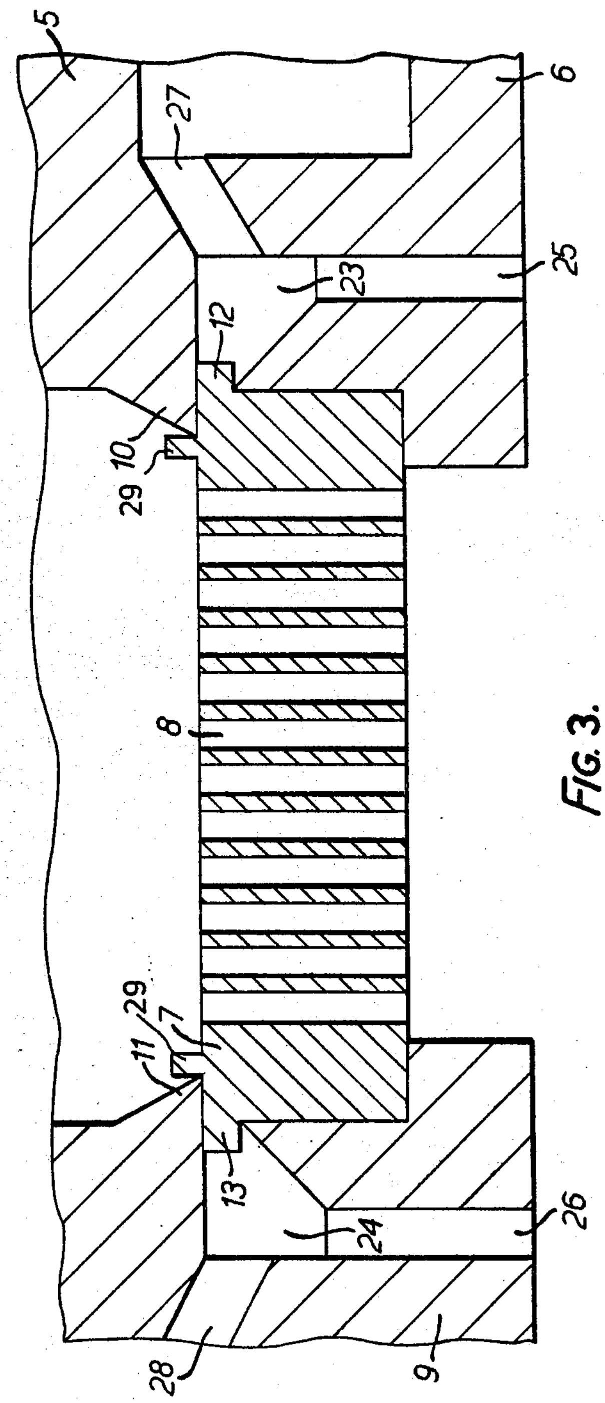
FIG. 3 is an enlarged sectional view of an alternative embodiment of the structure shown in FIGS. 1 and 2.

The penetration of powdery material can be further opposed by providing on the mould 7 inwardly extending ridges 29 which, as shown in FIG. 3, are situated close by the gaps between the mould holder and the mould and the supporting member and the mould.

I claim:

1. A press for compressing powdery material to grains comprising a loosely arranged, rotatable, annular, perforated mould supported and guided by a rotatable mould holder and by an axially displaceable supporting member which supports the mould at the end remote from the mould holder, the side face of the mould engaging the mould holder being urged by the supporting member with a given force against the mould holder in the operational position of the press in a manner such that during the operation of the press the mould is caught along by the mould holder owing to the force produced between the mould holder and the mould, whilst a rotatable roller is arranged in the mould, characterized in that an uninterrupted channel is provided at least at the level of the side face of the mould engaging the drivable mould holder.

2. A press as claimed in claim 1 characterized in that a further uninterrupted channel is provided at the level of the side face of the mould engaging the supporting member.

3. A press as claimed in claim 1 characterized in that at least one delivery passage communicates with the uninterrupted channel.

4. A press as claimed in claim 2 characterized in that at least one delivery passage communicates with the uniterrupted channel.

5. A press as claimed in claims 1, 2, 3 or 4 characterized in that at least one air supply passage communicates with the uninterrupted channel.

6. A press as claimed in claim 5 characterized in that the air supply passage opens out in the channel concerned at the level of the inner circumference of said channel.

7. A press as claimed in claims 1, 2, 3 or 4 characterized in that the mould holder and the supporting member are provided with protruding noses extending along the inner circumferential wall of the mould.

8. A press as claimed in claim 5 characterized in that the mould holder and the supporting member are provided with protruding noses extending along the inner circumferential wall of the mould.

9. A press as claimed in claim 6 characterized in that the mould holder and the supporting member are provided with protruding noses extending along the inner circumferential wall of the mould.

10. A press as claimed in claims 1, 2, 3 or 4 characterized in that the mould is urged by magnetic force against the mould holder.

11. A press as claimed in claims 1, 2, 3 or 4 wherein the mould has been provided with inwardly extending ridges near the points on both sides of the part of the mould wherein the passages have been provided.

12. A press as claimed in claim 5 wherein the mould has been provided with inwardly extending ridges near the points on both sides of the part of the mould wherein the passages have been provided.

13. A press as claimed in claim 6 wherein the mould has been provided with inwardly extending ridges near the points on both sides of the part of the mould wherein the passages have been provided.

14. A press as claimed in claim 7 characterized in that the mould is urged by magnetic force against the mould holder.

15. A press as claimed in claim 8 characterized in that the mould is urged by magnetic force against the mould holder.

16. A press as claimed in claim 9 characterized in that the mould is urged by magnetic force against the mould holder.

17. A press as claimed in claim 7 wherein the mould has been provided with inwardly extending ridges near the points on both sides of the part of the mould wherein the passages have been provided.

18. A press as claimed in claim 8 wherein the mould has been provided with inwardly extending ridges near the points on both sides of the part of the mould wherein the passages have been provided.

19. A press as claimed in claim 9 wherein the mould has been provided with inwardly extending ridges near the points on both sides of the part of the mould wherein the passages have been provided.

20. A press as claimed in claims 1, 2, 3 or 4 characterized in that, near its inner circumference, the mould is provided with an annular extension protruding into the uninterrupted channel.

21. A press as claimed in claim 5 characterized in that, near its inner circumference, the mould is provided with an annular extension protruding into the uninterrupted channel.

22. A press as claimed in claim 6 characterized in that, near its inner circumference, the mould is provided with an annular extension protruding into the uninterrupted channel.

23. A press as claimed in claims 1, 2, 3 or 4 characterized in that the mould holder of the supporting member is provided with protruding noses extending along the inner circumferential wall of the mould.

24. A press as claimed in claim 5 characterized in that the mould holder of the supporting member is provided with protruding noses extending along the inner circumferential wall of the mould.

* * * * *